US011853912B1

(12) United States Patent
Kasiviswanathan et al.

(10) Patent No.: US 11,853,912 B1
(45) Date of Patent: Dec. 26, 2023

(54) DETERMINING CAUSAL INSIGHTS

(71) Applicant: Amazon Technologies, Inc., Seattle, WA (US)

(72) Inventors: Shiva Prasad Kasiviswanathan, Dublin, CA (US); Nina Mishra, Pleasanton, CA (US); Yonatan Naamad, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 690 days.

(21) Appl. No.: 16/777,589

(22) Filed: Jan. 30, 2020

(51) Int. Cl.
*G06N 5/04* (2023.01)
*G06F 16/28* (2019.01)
*G06N 5/02* (2023.01)
*G06F 16/23* (2019.01)
*G06F 16/901* (2019.01)

(52) U.S. Cl.
CPC .......... *G06N 5/04* (2013.01); *G06F 16/2393* (2019.01); *G06F 16/285* (2019.01); *G06F 16/9024* (2019.01); *G06N 5/02* (2013.01)

(58) Field of Classification Search
None
See application file for complete search history.

(56) References Cited

U.S. PATENT DOCUMENTS

| | | | | |
|---|---|---|---|---|
| 2016/0231738 | A1* | 8/2016 | Kato | H04L 67/10 |
| 2017/0004511 | A1* | 1/2017 | Saini | H04L 67/02 |
| 2017/0096102 | A1* | 4/2017 | Nallapa | B60Q 9/007 |
| 2017/0140288 | A1* | 5/2017 | Pourshahid | G06N 5/022 |
| 2017/0329844 | A1* | 11/2017 | Tacchi | G06F 16/9024 |
| 2018/0005161 | A1* | 1/2018 | Cong | G06Q 10/06398 |
| 2018/0157663 | A1* | 6/2018 | Kapoor | G06Q 50/01 |
| 2019/0154713 | A1* | 5/2019 | Wales | G01N 31/00 |
| 2019/0303493 | A1* | 10/2019 | Ekambaram | G06F 16/288 |
| 2020/0160189 | A1* | 5/2020 | Bhattacharjya | G06N 5/022 |
| 2021/0142161 | A1* | 5/2021 | Huang | G06F 16/212 |

FOREIGN PATENT DOCUMENTS

| | | | | |
|---|---|---|---|---|
| IN | 202011000464 | A | * | 8/2021 |
| JP | 4935405 | B2 | * | 5/2012 |
| WO | WO-2020243965 | A1 | * | 12/2020 | ............ G06N 20/00 |

OTHER PUBLICATIONS

Kocaoglu, M. et al., Cost-Optimal Learning of Causal Graphs, International Conference on Machine Learning, http://proceedings.mlr.press/v70/kocaoglu17a/kocaoglu17a.pdf, 2017, 10 pages.

(Continued)

*Primary Examiner* — Augustine K. Obisesan
(74) *Attorney, Agent, or Firm* — Athorus, PLLC

(57) ABSTRACT

Described are systems and methods for determining causal connections between various metrics collected by wearable devices and using those causal connections to provide causal insights to other users. For example, some users may elect to perform one or more self-experiments to explore the impact certain changes in their behavior may have on metrics measured by the user's wearable device. Causal connections determined from those experiments may be used to provide causal insights relating to those metrics to other users who have not performed the same or similar experiments.

25 Claims, 11 Drawing Sheets

(56) References Cited

OTHER PUBLICATIONS

Kocaoglu, M. et al., Experimental Design for Learning Causal Graphs with Latent Variables, Advances in Neural Information Processing Systems, https://causalai.net/r28.pdf, 2017, 17 pages.
Lindgren, E. M. et al., Experimental Design for Cost-Aware Learning of Causal Graphs, Advances in Neural Information Processing Systems, https://papers.nips.cc/paper/7774-experimental-design-for-cost-aware-learning-of-causal-graphs.pdf, 2018, 11 pages.
Pearl, J., Causality: Models, Reasoning, and Inference, 2nd Edition, Cambridge University Press, http://bcmi.sjtu.edu.cn/home/niuli/download/Causality_2nd_Edition.pdf, 2009, 487 pages.
Spirtes, P. et al., Causation, Prediction, and Search, MIT Press, https://www.researchgate.net/profile/Peter_Spirtes/publication/242448131_Causation_Prediction_and_Search/links/0deec534be5d6a4fa7000000/Causation-Prediction-and-Search.pdf?origin=publication_detail, 2000, 568 pages.
Verma, T. and Pearl, J., An Algorithm for Deciding if a Set of Observed Independencies has a Causal Explanation, UAI, https://arxiv.org/ftp/arxiv/papers/1303/1303.5435.pdf, 1992, 8 pages.

\* cited by examiner

US 11,853,912 B1

DETERMINING CAUSAL INSIGHTS

BACKGROUND

Wearable devices are increasing in popularity. Many of the current devices include sensors that are operable to measure a variety of metrics about the user wearing the device. Metrics include heart rate, blood pressure, motion, step count, sleep quality, etc. Many current systems simply report the collected metrics to the user, for example, over a period of time. Some systems provide general correlations between the metrics (e.g., sleep is correlated with your ability to exercise, which is correlated to food intake, etc.). Such reporting and general correlations provide little value to users.

BRIEF DESCRIPTION OF DRAWINGS

The detailed description is described with reference to the accompanying figures.

DETAILED DESCRIPTION

Figure 1:
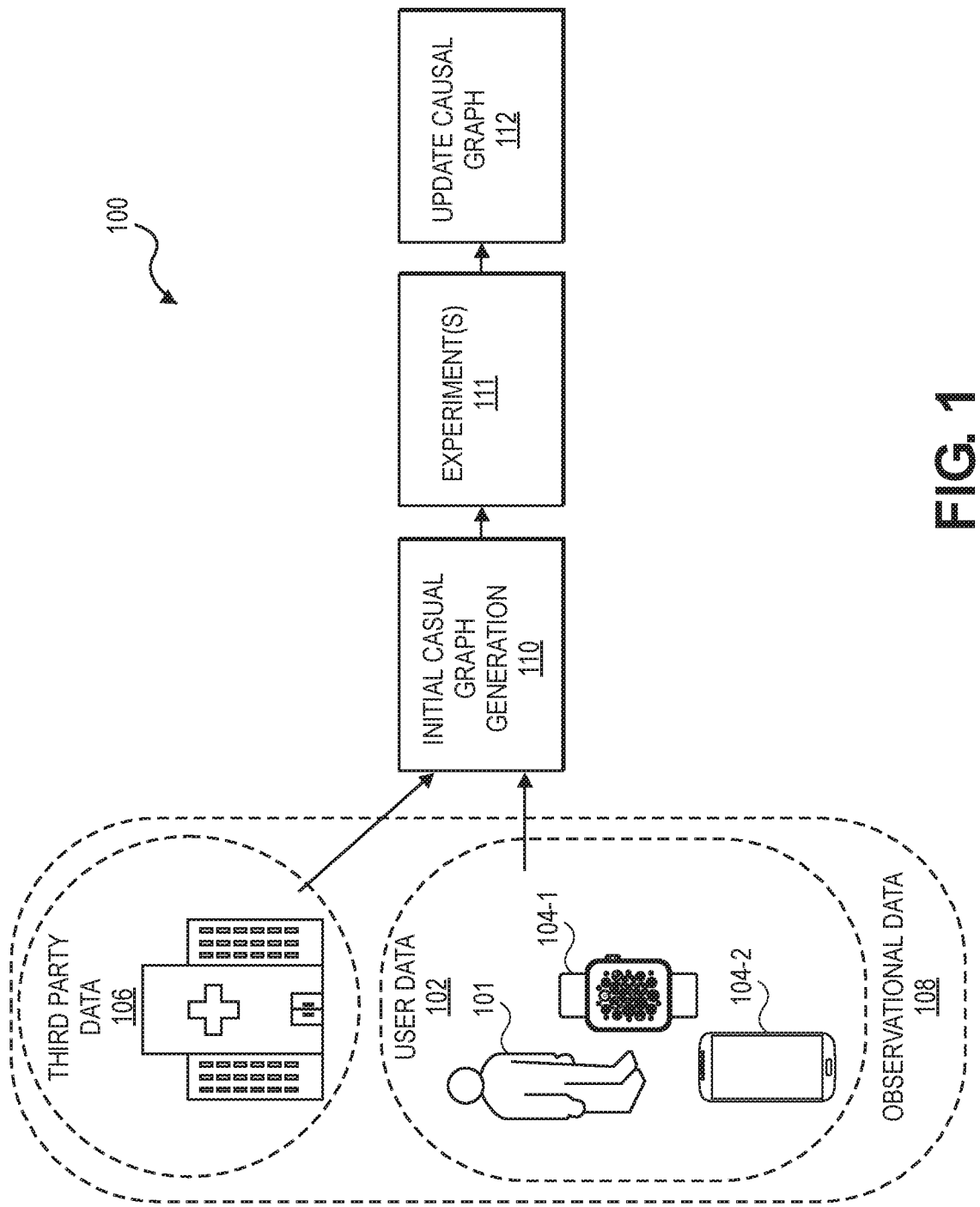
FIG. 1 is an example block diagram of a system that determines causal connections for a user based on observational data and experiment data about the user, in accordance with described implementations.

Described are systems and methods for determining causal connections between various metrics collected by wearable devices and using those determined causal connections to provide causal insights to other users. For example, some users of the disclosed implementations may elect to perform one or more self-experiments, referred to herein as experiments, to explore the impact certain changes in their behavior may have on metrics measured by the user's wearable device. For example, a first user may elect to perform an experiment to determine if they take at least 15,000 steps per day every day for seven days, will that change in behavior cause a change in the user's resting heart rate (a metric measured by the user's wearable device). The disclosed implementations collect experiment data during the defined period of time, in this example, seven days, that includes, among other metrics, the user step count and the user resting heart rate. The disclosed implementations may then determine, based on the experiment data and optionally based on observational data collected about the user during the defined period of time, before the defined period of time, and/or after the defined period of time, whether there is a causal connection between the user's step count and the user's resting heart rate.

In addition, the disclosed implementations may also use experiment data collected for some users to determine causal insights for other users that may or may not perform experiments. For example, initial causal graphs may be generated for each of a plurality of users based on observational data collected about those users from wearable devices of the user (and/or optionally from third party data, data manually provided by the user, etc.). For users that elect to perform experiments, such as the first user mentioned above, the initial causal graph may be updated to produce an updated causal graph that includes any causal connections determined from the experiments related to those metrics. Those causal graphs (initial causal graphs and updated causal graphs) may then be used, as discussed further below, to determine causal insights for users that may not have performed experiments. For example, the causal connection determined for the first user between step count (a first metric) and resting heart rate (a second metric) may be used to determine a causal insight for a second user indicating that if the second user increased their step count to at least 15,000 steps per day it will cause their resting heart rate to decrease/improve. As discussed further below, the causal insight for the second user is generated with a high degree of confidence for the second user based on the initial/updated causal graph of the second user, the updated causal graph of the first user, and initial/updated causal graphs of other users. The causal insights may be provided to users as recommendations or suggestions of behaviors that may be changed by the user to increase their health, wellness, etc.

As discussed below, an initial causal graph is generated for each user based on observational data collected for that user and those initial causal graphs may be updated based on experiments performed by those users to generate updated causal graphs. As will be appreciated, each user's initial causal graph and/or updated causal graph is unique because each user is unique. As such, there is no single causal graph that represents all users. For example, not drinking caffeinated beverages after 14:00 may improve some users sleep while, for others, it may have no effect on their sleep. As a result of these differences, the user's causal graphs will vary.

FIG. 1 is an example block diagram of a system 100 that determines causal connections for a user 101 based on observational data and experiment data about the user, in accordance with described implementations.

Observational data 108 for a user 101 may be collected over a period of time using sensors of one or more devices of the user 101, such as a wearable device 104-1, a portable device 104-2 of the user, etc. Wearable devices may include, but are not limited to, watches, wristbands, bracelets, necklaces, glasses, earrings, rings, jewelry, clothing, or anything else that may be worn by a user that includes one or more sensors that are operable to collect metric data relating to one or more metrics of a user. Portable devices may include, but are not limited to, cell phones, laptops, tablets, or any other device that includes one or more sensors that are operable to collect metric data relating to one or more metrics of a user.

Observational data 108 may include user data 102 and/or third party data 106. User data includes metric data collected by one or more devices of the user and/or metric data manually provided by the user (e.g., food intake, water intake, alcohol consumption, drug use, medication use, etc.). Third party data 106 may include any metric data about the user that is provided by a third party (e.g., medical facility). Metrics for which metric data is collected may include, but are not limited to, step count, heart rate, blood pressure, activity level, stand time, sit time, sleep time, sleep quality, sleep duration, body temperature, pulse rate, saturation percentage of oxygen in the blood, calorie intake, mood, alcohol consumption, drug use, medications taken, and/or anything else that may be measured by one or more sensors of a device of the user, provided by a third party, and/or provided by the user.

Utilizing the observational data 108, the disclosed implementations generate an initial causal graph 110 for the user 101. The initial causal graph represents candidate causal connections between metrics of the observational data 108. An example of a portion of an initial causal graph 200 is illustrated in FIG. 2A, in accordance with described implementations.

Figure 2A:
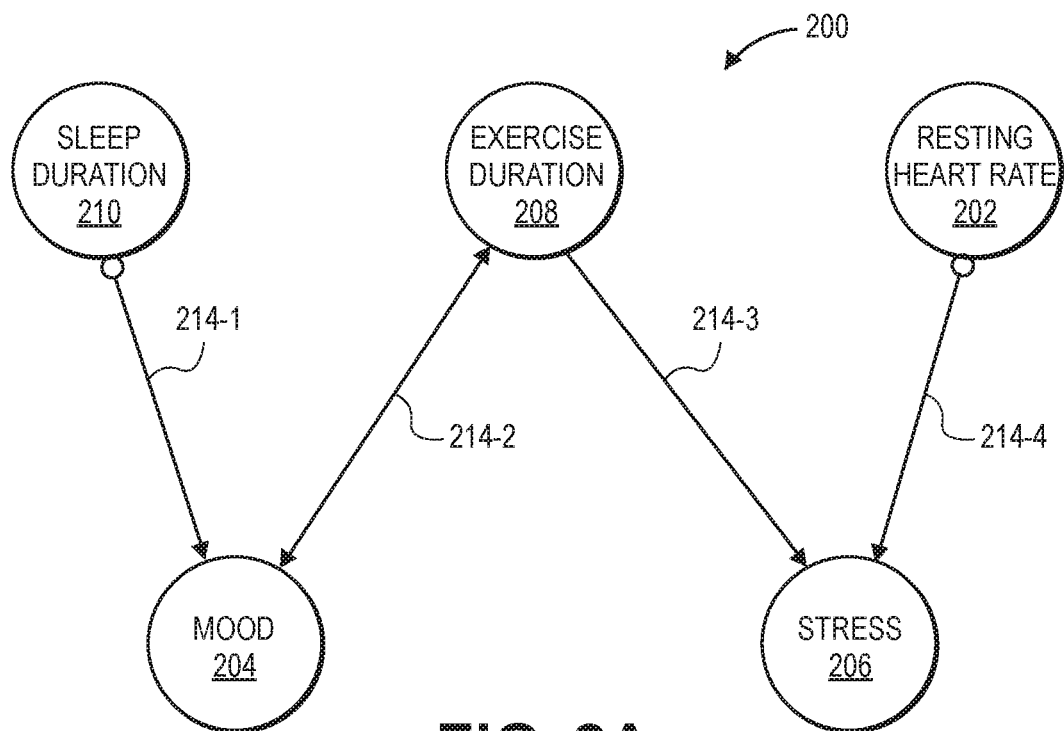
FIG. 2A is an example of a portion of an initial causal graph representing candidate causal connections determined from observational data, in accordance with described implementations.

As illustrated in FIG. 2A, the vertices of the initial causal graph 200 such as resting heart rate 202, mood 204, stress 206, exercise duration 208, and sleep quality 210 correspond to metrics included in observational data 108. Candidate causal connections between metrics of the observational data are represented by solid lines 214-1, 214-2, 214-3, 214-4 with the direction of the arrows of those lines indicating the potential direction of the cause-effect relationship. For example, lines with a single arrow pointing to one of the metrics, such as 214-3, indicates a candidate causal connection between exercise duration 208 and stress 206 and that a change in exercise duration 208 causes a change in stress 206. Causation represented by a line between two metrics may be direct or indirect. For example, a change in exercise duration 208 may have a direct effect on stress 206 or, alternatively, a change in exercise duration 208 may have a direct effect on another metric, such as blood pressure, that may cause the change in stress 206. The illustrated portion of the causation graph 200 does not distinguish between direct and indirect causation.

In comparison, lines that include arrows at both ends, such as line 214-2 indicate that there is no causal connection between the two metrics. For example, line 214-2 indicates that a change in exercise duration does not have a causal effect on the metric mood 204 and a change in the mood metric does not have causal effect on exercise duration 208.

Finally, a line with an "o" at one or both ends indicates that it is unknown whether one a change to one metric has a causal effect on another. For example, for line 214-1, based on observational data, it is unknown whether a change in sleep duration 210 has a causal effect on mood 204.

Candidate causal connections, such as those illustrated in FIG. 2A, may be determined from the observational data of a user by comparing pairs of metrics to determine whether the pair is independently conditioned on every other subset of metrics (i.e., checking whether metric X is independent of metric Y condition on some other subset S of metrics other than X and Y). If it is determined for all the independence tests, with different subsets of metrics S, that metric X and metric Y are dependent, a candidate causal connection is established between metric X and metric Y. For example, referring again to FIG. 2A, based on independence tests for the metric stress 206 and the metric exercise duration 208, it is determined that the metric stress 206 is potentially dependent upon the metric exercise duration 208. As a result, a candidate causal connection, as illustrated by line 214-3 is created between the metric exercise duration 208 and the metric stress 206 for the user.

Initial causal graph generation may be performed using a variety of techniques. For example, a fast causal interface algorithm, or some variation thereof may be utilized. Other example techniques include, but are not limited to, inductive causation algorithms, prediction causation algorithms, etc.

Returning to FIG. 1, in this example, the user 101 may also perform one or more self-experiments 111 to determine if changing one metric will cause an effect on another metric. In some implementations, as discussed below, the user may be presented with a list of potential experiments. In other examples, the user 101 may define their own experiment in which a first metric is controlled and another metric or set of metrics are measured over a defined period of time to determine if the change in the first metric has an effect on the other metric or set of metrics. For example, as discussed above, a user may select to fix the metric of step count for a defined period of time (e.g., seven days) and determine if the change in the step count has an effect on the metric sleep duration.

Experiment data for the user 101 is collected and used to update the initial causal graph to form an updated causal graph 112 for the user that includes causal connections and connection strengths determined from the experiments. For example, for each experiment in which the user 101 has participated, referred to herein as $\varepsilon = \{E_1, \ldots, E_l\}$, $X_1$ is defined as the independent variable for the experiment $E_i$ ($X_i$ is controlled). For every other metric Y included in the experiment data collected during the defined period of time of the experiment, an independence test is performed to determine whether $X_i$ and Y are dependent or independent. For example, a statistical independence test may be performed to determine whether $X_i$ and Y are dependent or independent. In some implementations, any statistical test that given samples from a joint distribution over metrics that can distinguish whether any given two metrics are independent or dependent may be utilized. In other implementations, the independence tests may be performed on a stream of data, where the observational data and the experiment data are received over a period of time.

If it is determined that $X_i$ and Y are dependent, a causal strength score is determined to indicate the strength of the dependence between $X_i$ and Y. For example, a regression of $X_i$ and Y may be determined as the statistical causal strength score of the relationship between $X_i$ and Y.

Figure 2B:
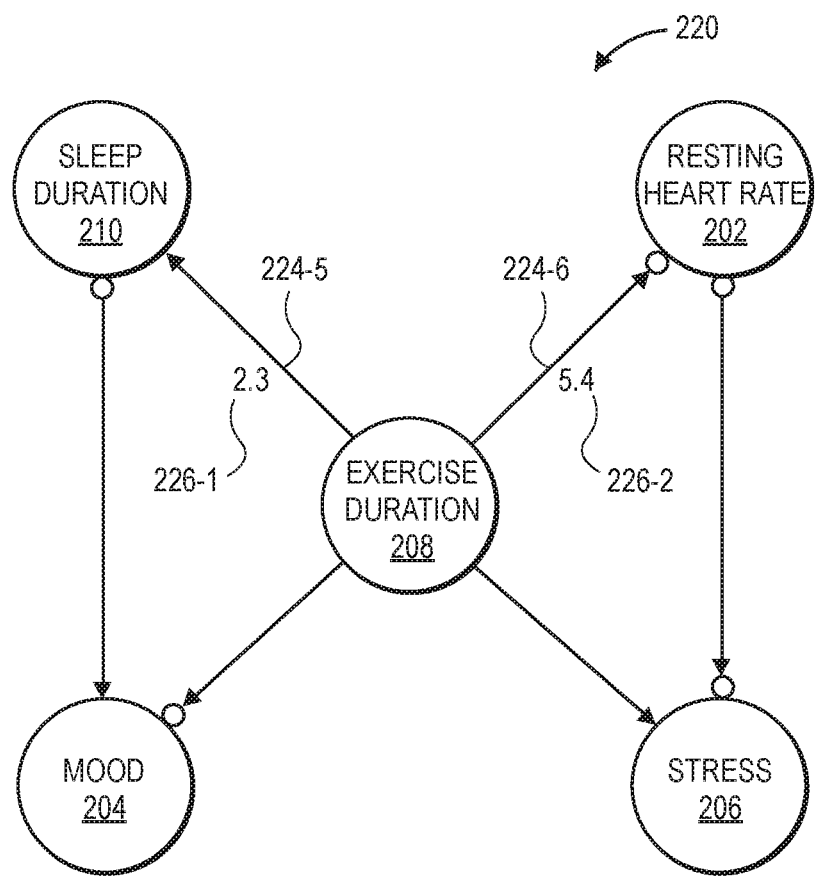
FIG. 2B is an example of a portion of an updated causal graph representing updated causal connections determined from observational data and experiment data, in accordance with described implementations.

Referring now to FIG. 2B, illustrated is a portion of an updated causal graph 220 that illustrates a causal connection 224-5 between the exercise duration metric 208 and the sleep duration metric 210 and that the causal connection has a strength score of 2.3 226-1. Likewise, the illustrated portion of the updated causal graph 220 indicates a causal connection 224-6 between the exercise duration metric 208 and the resting heart rate metric 202 and that the causal connection 224-6 has a strength score of 5.4 226-2. The strength score may be any measure or range indicating a strength of the causal connection between two metrics. For example, the strength score may be determined based on a linear model that determines the causal connection based on an amount of change in a first metric and the amount of change (effect) caused to the second metric. Referring to FIG. 2B, the strength score of 5.4 determined for the causal connection between the exercise duration and the resting heart rate may be determined based on the amount of change in the exercise duration and the difference (or effect) that change has on the resting heart rate. In other implementations, other techniques may be used to determine the strength score.

In this illustrated example, the causal connection between the exercise duration metric 208 and the resting heart rate metric 202 is determined to have a stronger causal connection compared to the causal connection between the exercise duration metric 208 and the sleep duration metric 210.

Figures 3A, 3B:
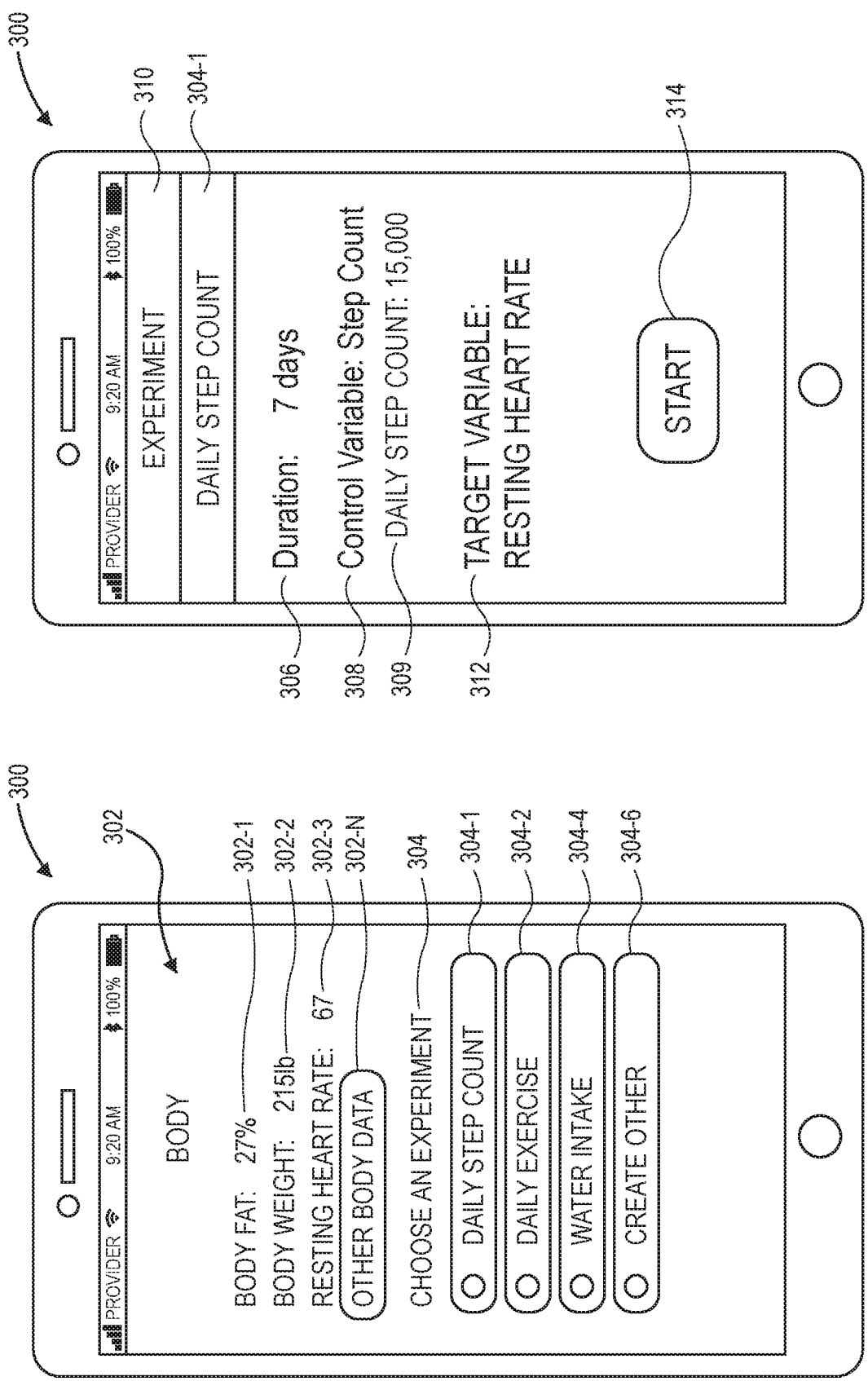
FIGS. 3A through 3C are example user interfaces that enable a user to select and perform an experiment, in accordance with described implementations.
Figure 3C:
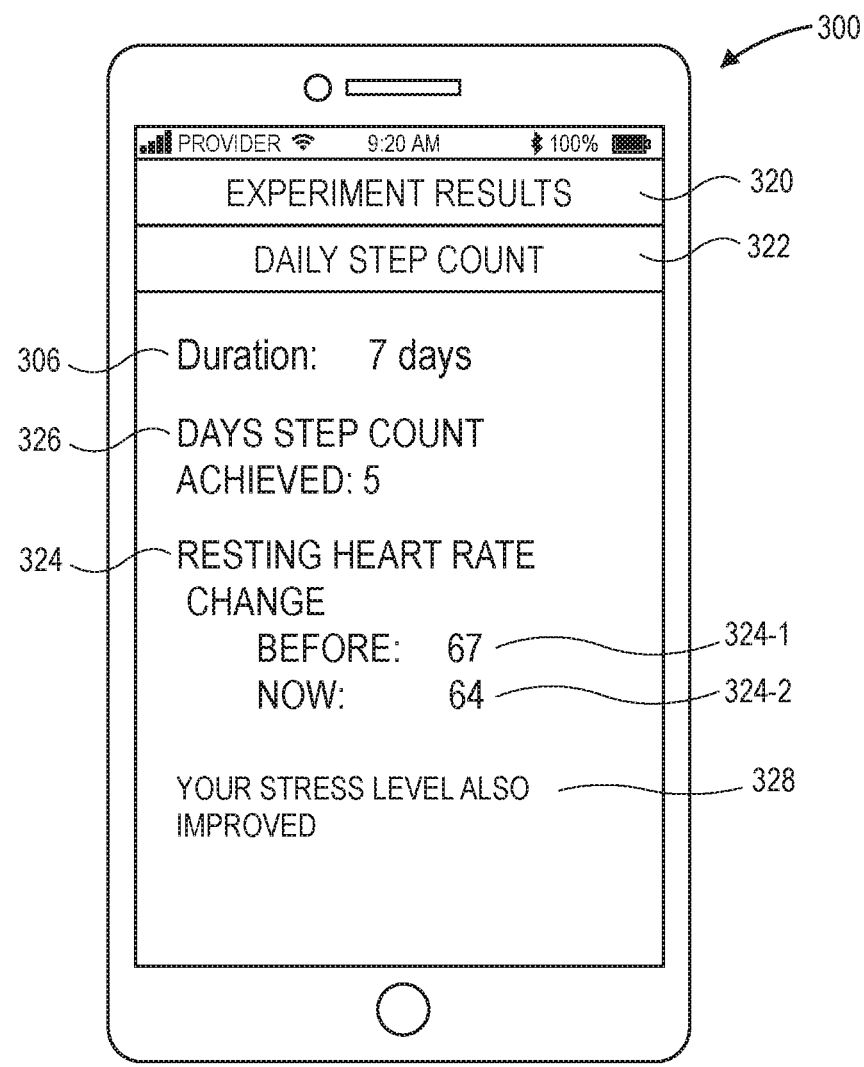

FIGS. 3A through 3C are example user interfaces that enable a user to select and perform an experiment, in accordance with described implementations.

Referring first to FIG. 3A, a user interface, which may be presented on a display of any device 300, such as a tablet, phone, etc., includes body metrics 302 (metrics), such as body fat percentage 302-1, body weight 302-2, and resting heart rate 302-3. The user may also view other body metrics that are collected by the wearable through selection of the other body data 302-N control.

In addition to body metrics 302, in this example, a user may select or choose an experiment 304. As discussed above, any of a variety of experiments may be selected by a user for self-experimentation. Experiments, as discussed herein, set one metric as a control during a defined period of time and measure the effect of setting that metric has on other metrics to determine if there is a causal connection between the metrics. In this example, the user may select from existing experiments including "Daily Step Count" 304-1, "Daily Exercise" 304-2, "Water Intake" 304-4, or select to create their own self experiment, through the "Create Other" control 304-6. As will be appreciated, the example experiments 304 and the information presented on the user interface of the device 300 are provided only as examples and other experiments and/or other information may be provided.

In this example, the user selects the experiment Daily Step Count 304-1. Referring now to FIG. 3B, illustrated is an example user interface for an experiment 310 presented on a display of the device 300 in response to the user selecting the Daily Step Count 304-1 experiment, in accordance with described implementations.

In this example, the defined duration 306, also referred to herein as a defined period of time, for the experiment is seven days. The user may select to alter (increase/decrease) the defined duration 306. The metric selected as the control 308 for this experiment is the daily step count 309. In particular, for this metric, the experiment specifies that the user is to take at least 15,000 steps per day during the defined period of the experiment. In addition, the experiment 310 user interface further specifies the metric being monitored during the exercise, also referred to herein as the target variable 312, is the user's resting heart rate.

In this example, the user may alter the defined duration 306 of the exercise and/or the daily step count 309 target. Once the structure for the experiment has been established, the user may select the Start control 314 to begin the experiment. During the experiment, experiment data is collected by the wearable device of the user, received manually from the user, and/or received from third party sources, as discussed above. The experiment data includes at least metric data corresponding to the daily step count of the user and the resting heart rate of the user.

Referring now to FIG. 3C, illustrated is an experiment results 320 user interface presented on the display of the device 300 for the daily step count experiment 322, in accordance with the described implementations.

The experiment results 320 may be presented upon completion of the experiment and may include, for example, the defined duration 306 of the experiment during which the experiment was performed, the days in which the control metric was achieved 326 by the user performing the experiment and the effect the change in the control metric had on the measured metric, in this example the resting heart rate 324 of the user. In the illustrated example, the user interface 320 indicates that during the defined duration 306 of the experiment, the user achieved the specified step count for the control metric 5 out of the 7 days and as a result, the user's resting heart rate changed from a resting heart rate 324-1 of 67 before the experiment, as determined from observational data collected for the user, to a current resting heart rate 324-2 of 64. In addition, in this example, it is also determined that the change in the control metric of daily step count also resulted in the stress level metric 328 of the user improving.

As discussed herein, through performance of an experiment, the disclosed implementations can determine whether a causal connection for a user exists between metrics of interest. In the above example, based on the observational data and the experiment data collected for the user, it can be determined whether there is a causal connection between the step count metric of the user and the resting heart rate metric of the user. Other experiments may likewise be performed to determine whether causal connections exist between other user metrics.

With causal connections between metrics of users determined through experiments performed by those users, the disclosed implementations may also use that data to determine causal insights for other users.

Figure 4:
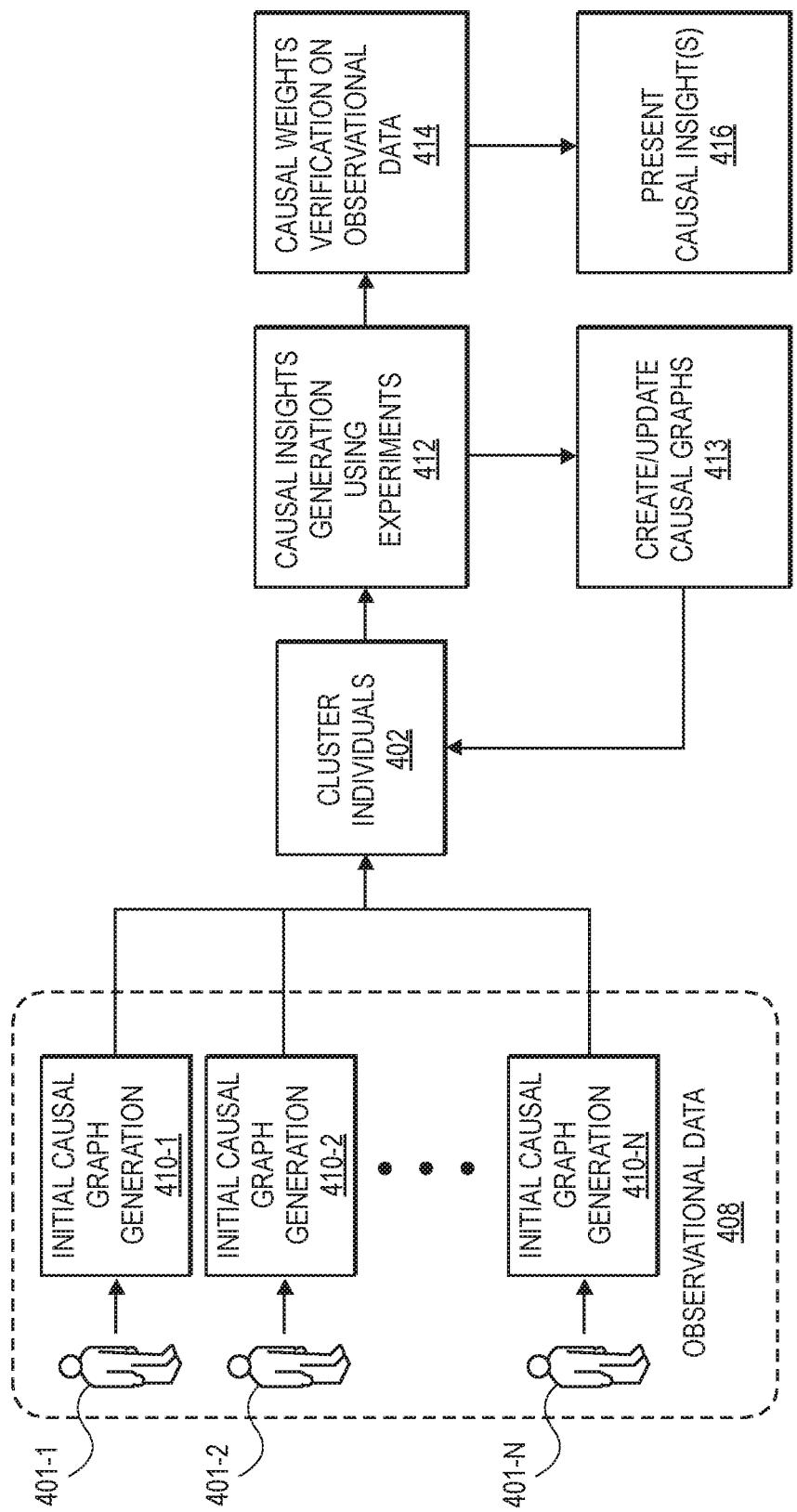
FIG. 4 is an example block diagram of a system that determines causal insights for a user based on observational data and experiment data from a cluster or users, in accordance with described implementations.

FIG. 4 is an example block diagram of a system 400 that determines causal insights for a user based on observational data and experiment data from a cluster or users, in accordance with described implementations.

As illustrated, a plurality of users, such as users 401-1, 401-2, through 401-N may participate in a system that collects observational data 408 from wearable devices of the users, from manual inputs from the users, and/or from third parties, as discussed above. Any number of users may utilize the system and users may elect what collected observational data may be utilized by the system, for example, to generate causal insights for other users. Likewise, through aggregation, the system may anonymize the observational data and/or experiment data so that the metrics used with the disclosed implementations are not associated with a specific user. For example, the initial causal graphs and/or the updated causal graphs created for a user may be associated with a unique identifier rather than a particular user. In other implementations, other techniques may be used to maintain user privacy.

As illustrated in FIG. 4, observational data may be used to generate an initial causal graph for each user 401 for which observational data is collected. For example, a first initial causal graph 410-1 may be generated from first observational data 408 collected for a first user 401-1, a second initial causal graph 410-2 may be generated from second observational data 408 collected for a second user 401-2, and an Nth initial causal graph 410-N may be generated from Nth observational data 408 collected for an Nth user 401-N. Generation of an initial causal graph for each user based on observational data is discussed above with respect to FIG. 1.

Based on the initial causal graphs of users 401-1 through 401-N, users may be grouped into different clusters 402. For example, users may be associated with clusters based on the similarity of the initial causal graph 410 of the user with initial causal graphs 410 of other users. A variety of clustering techniques may be used to cluster users based on the initial causal graphs. For example, in one implementation, embedding vectors may be generated for each causal graph using graph embedding techniques and the clusters of the users may be performed based on a distance between the embedding vectors in an embedding space. In other implementations, other clustering techniques may be used to cluster users based on the similarity of the initial causal graphs generated for those users.

As will be appreciated, any number of clusters may be formed from the initial causal graphs formed for the plurality of users 401. In some implementations, each user 410 may be associated with one and only one cluster. In other implementations, users may be associated with more than one cluster. In addition, users may be re-clustered on a periodic or ongoing basis as the causal graphs for the users change based on updated observational data and/or experiment data obtained for the user. For example, as discussed above, users may perform one or more experiments, experiment data may be collected during those experiments, causal connections between metrics for the user determined from those experiments, and the initial causal graph of the user updated to form an updated causal graph for the user that includes any determined causal connections and/or causal strengths determined from those experiments.

Based on the clusters in which the users are associated, the experiment data collected for others in the same cluster may be used to determine causal insights 412 for other users of the cluster. For example, for a first user included in a cluster, causal insights may be determined for that user based on the causal connections between metrics of other users of the cluster based on experiments performed by those other users. As an illustrative example, for a cluster to which a first user (A) belongs there is a list of causal connections $C=\{c_1, \ldots, C_r\}$ determined from other users (excluding A) in that cluster. For each $c_i \in C_i$ a non-parametric causality test, such as a Granger causality test, is performed to determine whether $c_i$ is a valid causal insight for user A. Other forms of machine learning algorithms may likewise be utilized. If it is determined that $c_i$ is a valid causal insight for A, then the causal connection $c_i$ is indicated as an insight for user A.

In addition, in some implementations, the initial causal graph of user A may also be updated to produce an updated causal graph 413 that includes the determined causal insight between the metrics. As noted above, as the causal graphs are updated, users may be re-clustered based on the changes to the causal graphs.

In addition, in some implementations, causal strength scores for the causal insights for a user, such as user A, may be determined 414. Similar to determining causal strength scores for causal connections determined through experiments, causal strength scores may be determined for causal insights using observational data of the user and regressing the relevant metrics of the observational data of the user (user A) to estimate the causal strength of the relationship between those metrics for the user.

The causal strength scores generated for each causal insight may be used to determine whether and/or which causal insights are presented 416 to the user. For example, and continuing with the example of user A, if multiple causal insights are determined for user A based on experiments performed by other users in the same cluster as user A, those causal insights may be ranked based on the causal strength scores determined for those causal insights with respect to user A. Causal insights having the highest causal strength scores (i.e., the strongest causal connection) may be ranked highest and those highest ranked causal insights may be presented to the user as causal insights for the user. In other examples, or in addition thereto, a threshold may be established, and only causal insights having a causal strength score above the threshold may be presented to the user as causal insights. The threshold may be any value, may vary based on the user, the cluster, the number of causal insights determined for the user, the causal strengths determined for causal insights determined for a user, etc.

Causal insights may be provided to a user in a variety of manners. For example, causal insights may be provided as suggested experiments to be performed by the user. As one example, referring briefly back to FIG. 3A, a causal insight may be presented to a user as an experiment 304 option that the user may perform. In other examples, the causal insight may be provided as a suggested or recommended change.

Figure 5:
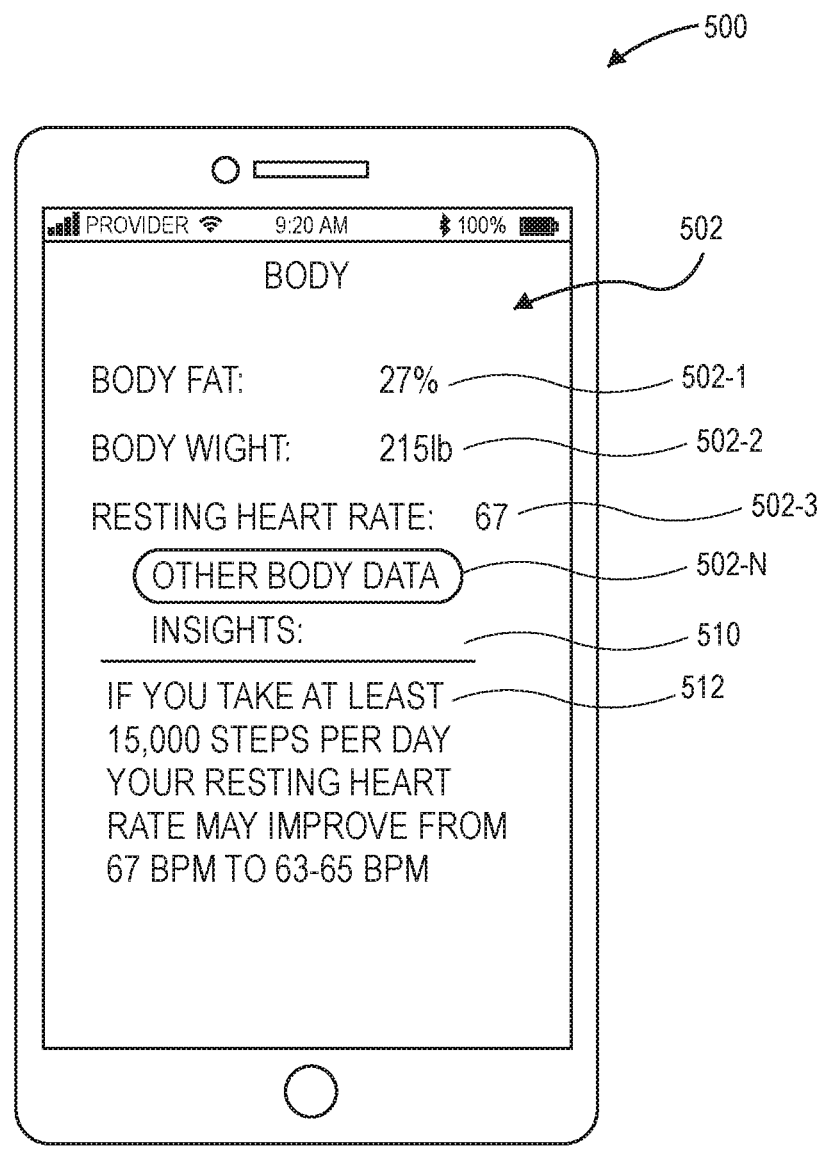
FIG. 5 is an example user interface that provides causal insights to a user, in accordance with described implementations.

FIG. 5 is an example user interface that provides causal insights to a user, in accordance with described implementations. Similar to the above discussion with respect to FIGS. 3A through 3C, the user interface may be presented on a display of any type of device 500.

In this example, the user interface includes body metrics 502, such as body fat 502-1, body weight 502-2, and resting heart rate 502-3 for the user. As with the above example, the user may also select the "Other Body Data" control 502-N to view other metrics collected for the user. In this example, the user interface also includes insights 510, such as "If you take at least 15,000 steps per day your resting heart rate will improve from 67 bpm to 63-65 bpm" 512. The provided causal insight 512 is determined for the user through the above described implementations that utilize causal connections determined through experiments of other users to determine the causal insight 512 for a user who is included in the same cluster as those users that performed the experiments.

Figure 6:
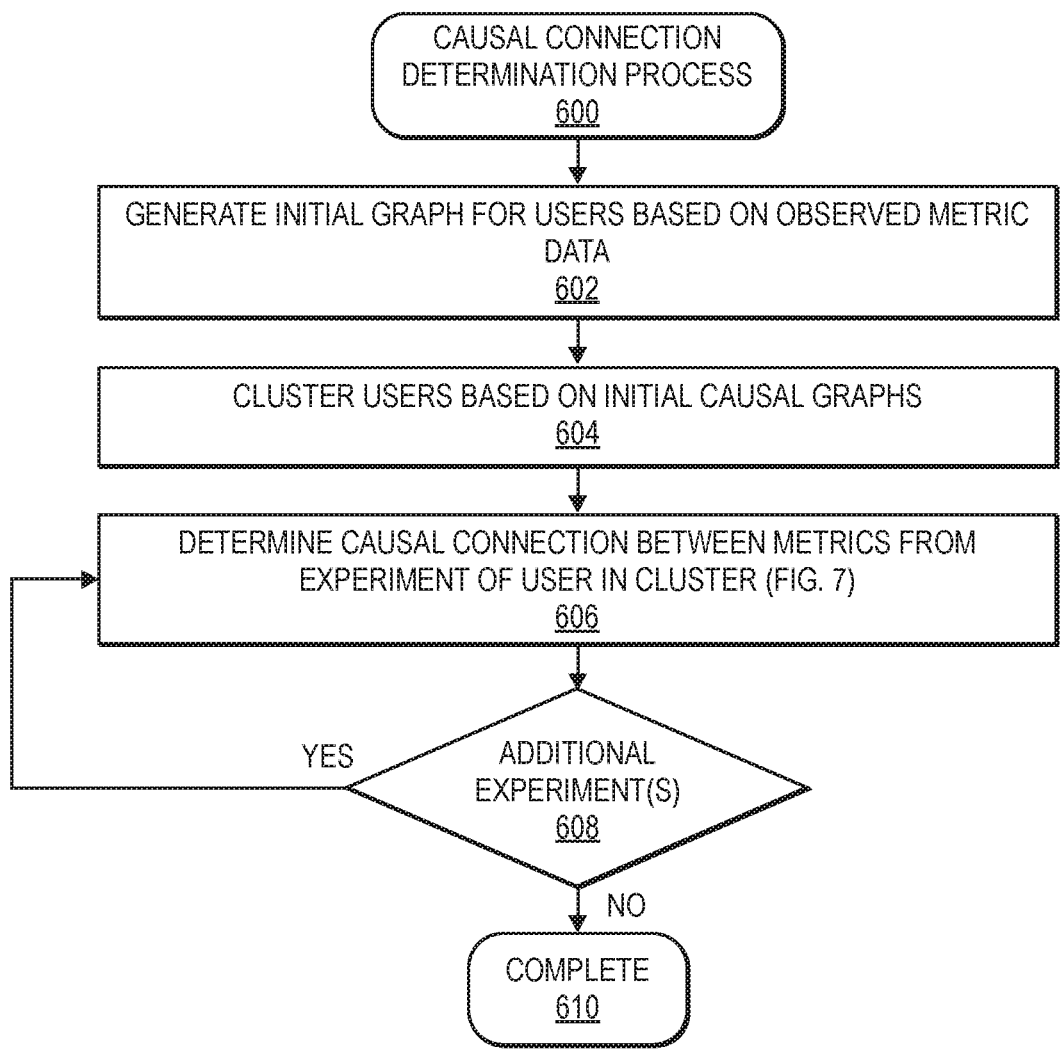
FIG. 6 is an example causal connection determination process, in accordance with described implementations.

FIG. 6 is an example causal connection determination process 600, in accordance with described implementations.

The example process 600, as well as the other processes and implementations discussed herein may be performed by a user device or wearable device, such as the device discussed below with respect to FIG. 9, by one or more remote computing systems or servers, such as the one discussed below with respect to FIG. 10, or on any combination of devices.

The example process 600 begins by generating initial causal graphs for a first plurality of users based on observational data collected for each of those first plurality of users, as in 602. As will be appreciated, each user's initial causal graph may have differences and similarities compared to other user initial causal graphs because each user is unique.

Based on the initial causal graphs, users are clustered based on the similarities of those initial causal graphs, as in 604. As discussed above, a variety of clustering techniques may be used to cluster users based on their initial causal graphs. For example, an embedding vector may be generated for each causal graph and the distance between those embedding vectors in an embedding space may be used to cluster users. For example, a first cluster that includes a second plurality of users that are included in the first plurality of users but not more than the first plurality of users may be included in a first cluster based on a similarity between the initial causal graphs of those second plurality of users (e.g., based on the distance between the embedding vectors). Likewise, a third plurality of users that are included in the first plurality of users but not more than the first plurality of users and different than the second plurality of users may be included in a second cluster based on the similarity of the initial cluster graphs of those third plurality of users. As will be appreciated, any number of clusters may be formed from the first plurality of users and the clusters may vary in size or may all be the same size or distribution. In some implementations, users may be assigned to a cluster if the distance or similarity of the initial causal graph is within a defined distance or similarity of other initial causal graphs of other users included in the cluster.

For each particular cluster, causal connections between two or more metrics are determined for users within that cluster based on experiments performed by those users, as in 606. Determining causal connections between metrics of a user based on experiments performed by that user are discussed above and discussed further below with respect to FIG. 7. A determination may then be made for each user of a cluster whether additional experiments remain for which causal connections are to be determined, as in 608. If additional experiments remain, the example process 600 returns to block 606 and continues. If there are no additional experiments for which causal connections are to be determined, the example process 600 completes, as in 608.

The example process 600 may be performed for each user of each formed cluster until causal connections for each experiment by each user of the different clusters have been determined. Likewise, in some implementations, as causal connections are determined and the causal graph of the user that performed the experiment updated, the clusters of users may be updated as part of the example process 600.

Figure 7:
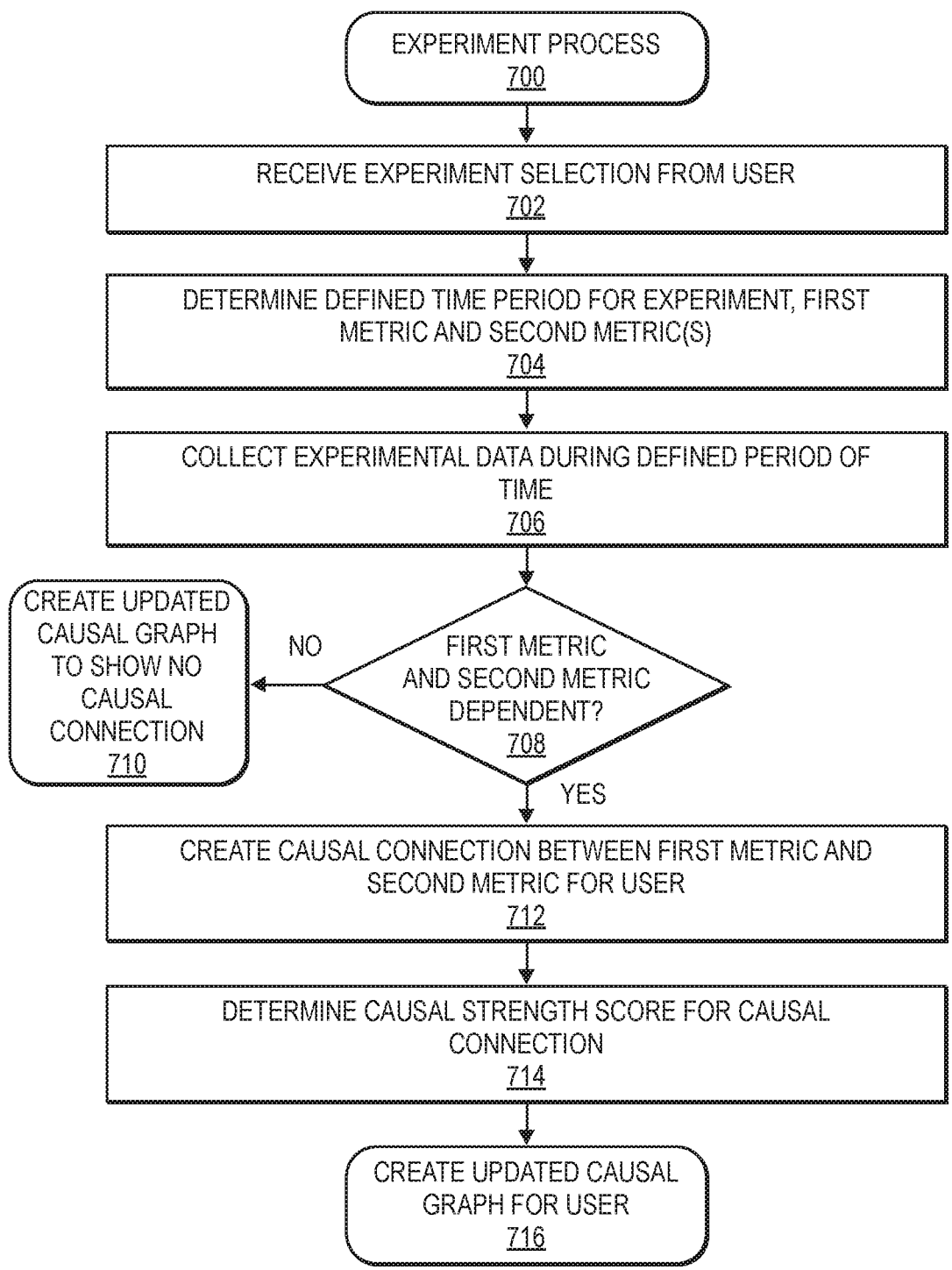
FIG. 7 is an example experiment process, in accordance with described implementations.

FIG. 7 is an example experiment process 700, in accordance with described implementations.

The example process 700 begins upon selection of an experiment by a user, as in 702. As discussed above, a user may select or create a self-experiment that changes one metric, referred to as the control metric, and monitor or measure the effect of that change on one or more other metrics of the user.

Upon selection of an experiment by a user, the example process determines a defined period of time during which the experiment is to be performed, a first metric that will be set as the control metric that the user desires to change and maintain as the control and a second metric that will be measured to determine if the change to the first metric causes an effect on the second metric, as in 704. As discussed above, in some implementations, a user may define their own experiment, select from a set of established experiments, etc. Likewise, the user may be able to specify the amount of the change to the first metric (control metric), the defined duration of the experiment, etc.

Upon initiation of the experiment by the user and during the experiment, the example process collects experiment data for the user that is generated by sensors of a device of the user (e.g., wearable device), provided manually by the user, and/or obtained from one or more third parties, as in 706. The experiment data includes at least metric data for the first metric and the second metric. In some implementations, the experiment data may also include other metric data.

Upon completion of the experiment, a determination is made based at least in part on the experiment data whether the first metric and the second metric are dependent, as in 708. As discussed above, a statistical independence test may be performed on the experiment data to determine if the first metric and the second metric are dependent. In some implementations, any statistical test that given samples from a joint distribution over metrics that can distinguish whether any given two metrics are independent or dependent may be utilized. In other implementations, the independence tests may be performed on a stream of data, where the observational data and the experiment data are received over a period of time. Examples of independence tests that may be utilized with the disclosed implementations include, but are not limited to, mutual information independence tests, chi-square independence tests, z-test, etc.

If it is determined that the first metric and the second metric are not dependent, the initial causal graph is updated to form an updated causal graph indicating that there is no causal connection between the first metric and the second metric, as in 710. If it is determined that the first metric and the second metric are dependent, a causal connection between the first metric and the second metric for the user is established, as in 712. In addition, a causal strength score is also determined for the causal connection, as in 714. For example, a regression of the first metric and the second metric may be determined as the statistical causal strength of the relationship between the first metric and the second metric.

The initial causal graph for the user is then updated to create an updated causal graph for the user that includes the determined causal connection between the first metric and the second metric and the determined causal strength for the causal connection, as in 716.

The example process 700 may be performed for each experiment performed by each user. Each time a user performs an experiment, their causal graph may be updated to include any determined causal connection, or no causal connection, between metrics and the corresponding causal strength for determined causal connections. For example, if the user has previously performed an experiment and an updated causal graph generated for the user, and the user performs another experiment, the updated causal graph will again be updated to include the results of that subsequent experiment. This updating may be performed for each experiment performed by a user.

Figure 8:
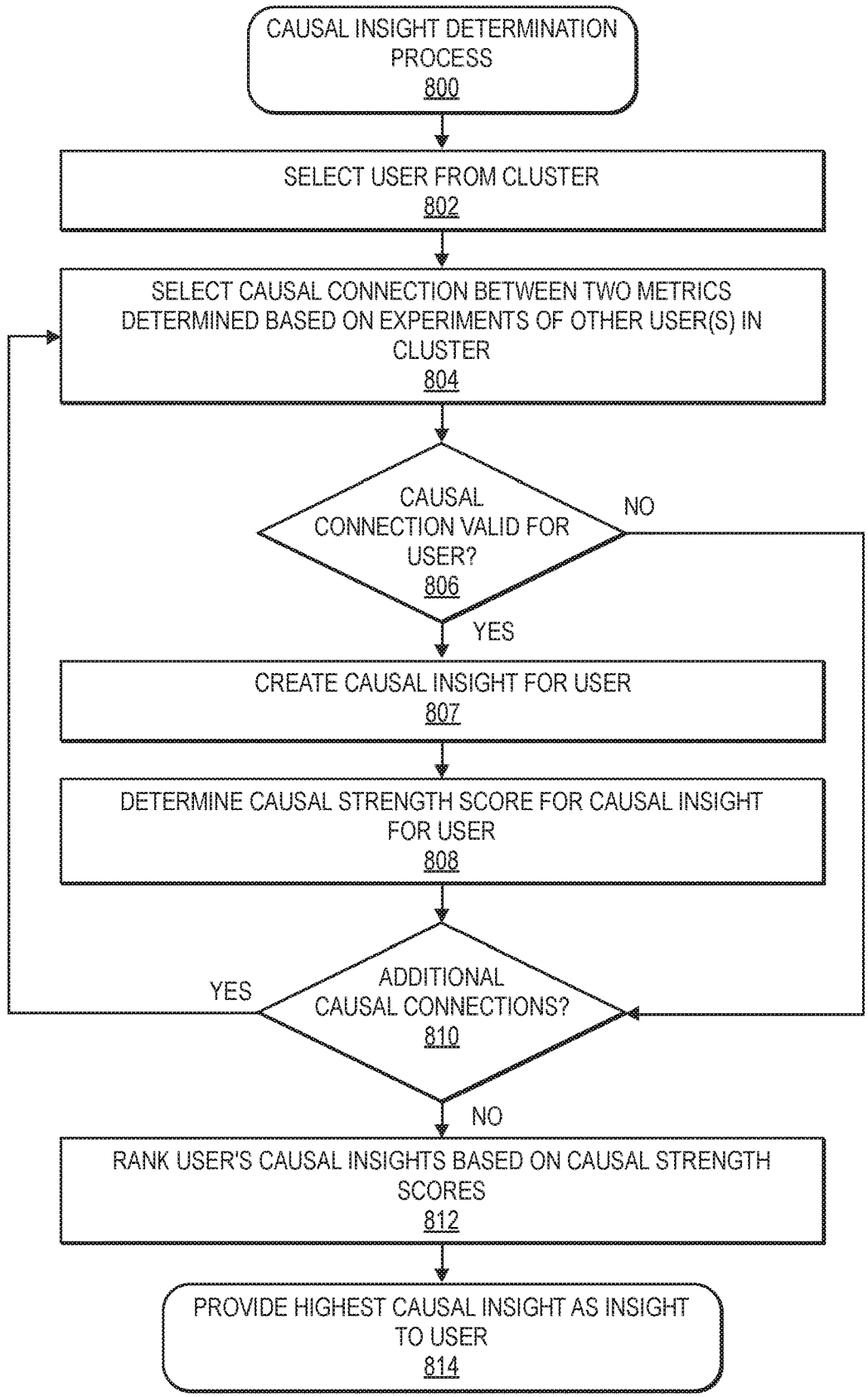
FIG. 8 is an example causal insight determination process, in accordance with described implementations.

FIG. 8 is an example causal insight determination process 800, in accordance with described implementations.

The example process 800 may be performed for any user of a cluster, regardless of whether the user has performed experiments or not. For example, even though a user may not have performed any experiments, causal connections between metrics determined through experiments of other users in the cluster may be used to determine causal insights for that user. Likewise, for a user that has performed experiments, causal insights may be generated for that user based on experiments of other users within the cluster that determine causal connections between metrics for which the user has not yet performed an experiment.

The example process 800 begins upon selection of a user from a cluster, as in 802. A causal connection between two metrics that exists for the cluster, as determined from experiments performed by other users in the cluster, is also selected, as in 804. In some implementations, a causal connection between two metrics that exists for the cluster may only be selected by the example process 800 when a defined number of users of the cluster have performed experiments and it is determined from those experiments that causal connections between the metrics exists for those users that performed the experiments, or minimum defined percentage thereof.

For the selected causal connection, a determination is made as to whether the causal connection is valid for the selected user, as in 806. For example, a non-parametric causality test, such as a Granger causality test, may be performed to determine whether the causal connection is valid for the selected user.

If it is determined that the causal connection is valid for the user, a causal insight between those metrics is created for the selected user, as in 807. In addition, a causal strength score for the causal insight is also determined, as in 808. As discussed above, the causal strength score may be determined from a regression of the observational data of the two metrics of the selected user.

After determining the causal strength score for the causal insight, or if it is determined at decision block 806 that the causal connection is not valid for the selected user, the example process 800 may then determine whether additional causal connections exist for the cluster, as determined from experiments performed by users of the cluster, as in 810. If it is determined that additional causal connections exist for the cluster, the example process 800 returns to block 804 and selects the next cluster.

If it is determined that no additional causal connections exist for the cluster, the determined causal insights for the selected user may be ranked based on the causal strength scores determined for those causal insights, as in 812, and one or more of the highest ranking causal insights may be provided to the selected user, as in 814. In other implementations, only causal insights with causal strength scores above a threshold value may be provided to the user. As discussed above, causal strength scores may be provided as suggested or recommended changes to one behavior of the user that will cause a change in another metric of the user, provided as suggested experiments, etc.

Figure 9:
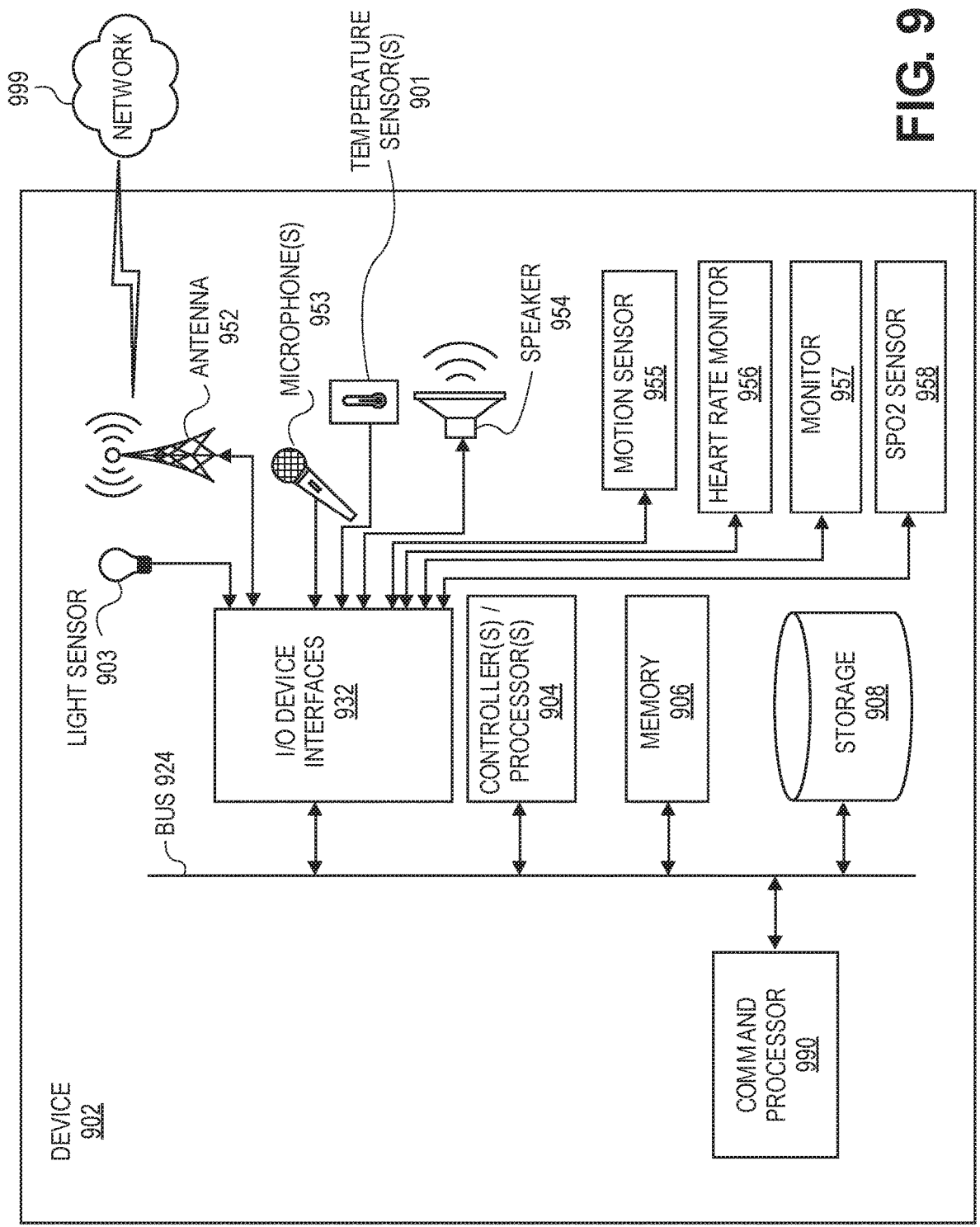
FIG. 9 illustrates example components of a user device, in accordance with described implementations.
Figure 10:
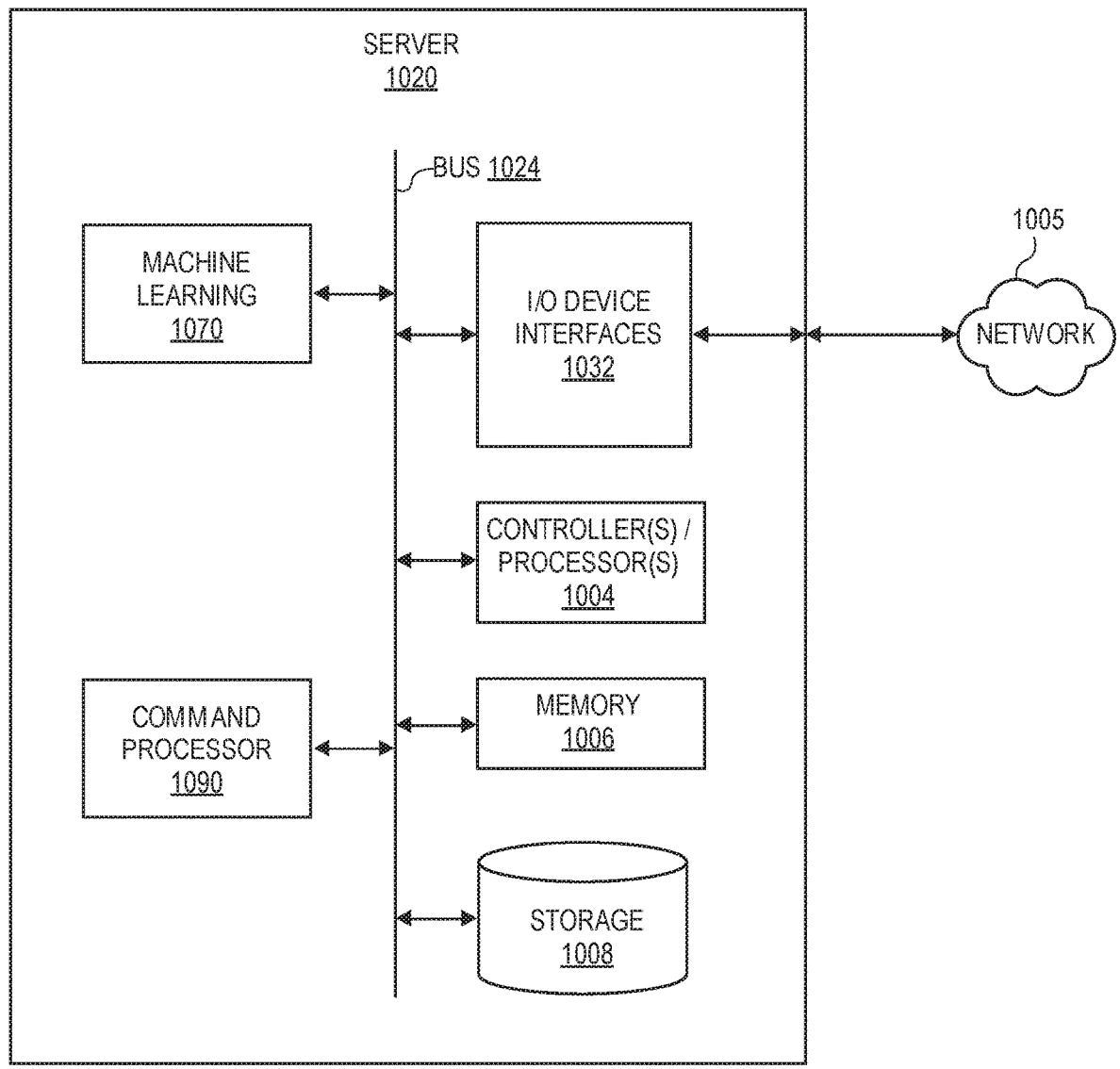
FIG. 10 illustrates example components of a server, in accordance with described implementations.

FIG. 9 is a block diagram conceptually illustrating a wearable or user device 902 that may be used with the described implementations. FIG. 10 is a block diagram conceptually illustrating example components of a remote computing device, such as a remote server 1020 that may be used with the described implementations. Multiple such servers 1020 may be included in the system, such as one server(s) 1020 for determining causal connections based on experiment data, one server(s) for determining causal insight, one server(s) for determining clusters, etc. In operation, each of these devices (or groups of devices) may include computer-readable and computer-executable instructions that reside on the respective device (902/1020), as will be discussed further below.

Each of these devices (902/1020) may include one or more controllers/processors (904/1004), that may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM) and/or other types of memory. Each device may also include a data storage component (908/1008), for storing data, controller/processor-executable instructions, observational data, experiment data, cluster associations, etc. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (932/1032).

Computer instructions for operating each device (902/1020) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (902/1020) includes input/output device interfaces (932/1032). A variety of components may be connected through the input/output device interfaces. Additionally, each device (902/1020) may include an address/data bus (924/1024) for conveying data among components of the respective device. Each component within a device (902/1020) may also be directly connected to other components in addition to (or instead of) being connected to other components across the bus (924/1024).

Referring to the device 902 of FIG. 9, the device 902 may be "headless" and may primarily rely on spoken commands for input and/or through interaction with one or more control interfaces or buttons. In other examples, the device 902 may include a display, which may allow a touch-based interface. The device 902 may also include input/output device interfaces 932 that connect to a variety of components such as an audio output component such as a speaker 954, a wired headset or a wireless headset, and/or other components capable of outputting audio. The device 902 may also include an audio capture component. The audio capture component may be, for example, a microphone 953 or array of microphones, a wired headset or a wireless headset, etc. The microphone 953 may be configured to capture audio, such as environmental noises. If an array of microphones is included, approximate distance to a sound's point of origin may be determined using, for example, acoustic localization based on time and amplitude differences between sounds captured by different microphones of the array.

The device 902 may also include other sensors that collect sensor data, that may be representative of user data, also referred to herein as metric data about the user. Any number and/or type of sensors may be included in the device. In the illustrated example, in addition to the microphone, the device 902 includes a light sensor 903 that may measure the ambient light, one or more temperature sensors 901 that may measure the ambient temperature and/or measure the temperature of the user. In addition, the device 902 may include a motion sensor 955, such as an accelerometer, gyroscope, etc., to measure movement of the user, a heart rate monitor 956 to measure the heart rate of the user, an SpO2 sensor 958 to measure the saturation percentage of oxygen in the blood, and/or other sensors/monitors 957 to measure other user data and/or environment data.

The device may also include a communication interface, such as an antenna 952. Any form of wired and/or wireless communication may be utilized to facilitate communication between the device 902 and other devices. For example, any one or more of 802.15.4 (ZIGBEE), 802.11 (WI-FI), 802.16 (WiMAX), BLUETOOTH, Z-WAVE, near field communication ("NFC"), etc., may be used to communicate between the device 902 and one or more sensors and/or appliances. For example, the device 902 may be configured to transmit observational data and/or experiment data that is collected by sensors of the device. For example, via the antenna(s), the input/output device interfaces 932 may connect to one or more networks 999/1005 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, etc. A wired connection such as Ethernet may also be supported.

The device 902 and/or server 1020 may also include a command processor (990/1090) that is configured to execute commands/functions such as monitoring metrics, determining causal connections between two or more metrics, monitoring experiments, etc.

The server may also include one or more machine learning networks 1070, such as a CNN. The machine learning network(s) 1070 may process observational data and/or experiment data to associate users with clusters, to determine causal connections between metrics, to determine causal insights, to determine causal strength scores, etc.

In some implementations, multiple devices may be employed in a single system to measure observational data that is provided to the server 1020 and utilized with the disclosed implementations. The components of the devices 902 and server 1020, as illustrated in FIGS. 9 and 10, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, etc., should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately,""generally," "nearly" or "substantially" as used herein, represent a value, amount, or characteristic close to the stated value, amount, or characteristic that still performs a desired function or achieves a desired result. For example, the terms "about," "approximately," ""generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   for each of a first plurality of users:
      collecting, over a first period of time and using one or more sensors of one or more devices of the user, observed metric data for a plurality of metrics, wherein each metric of the plurality of metrics is about the user;
      generating, based at least in part on the observed metric data, an initial causal graph indicating one or more candidate causal connections between two or more metrics of the plurality of metrics, wherein each of the one or more candidate causal connections indicate a potential cause-effect relationship between a pair of metrics of the plurality of metrics;
   for each of a second plurality of users that are included in the first plurality of users and no more than the first plurality of users:
      receiving, from the user, a selection of an experiment to be performed by the user during a second period of time that is subsequent to the first period of time, wherein the experiment includes changing a first metric of the pair of metrics for the second period of time;
      collecting, over the second period of time as the experiment is performed and using the one or more sensors of the one or more devices of the user:
         first experiment metric data for the first metric of the pair of metrics; and
         second experiment metric data for a second metric of the pair of metrics;
      determining, based at least in part on the first experiment metric data and the second experiment metric data, that the change to the first metric caused an effect on the second metric; and
      in response to determining that the change to the first metric caused the effect on the second metric, updating the initial causal graph to form an updated causal graph for the user that includes a causal connection between the first metric and the second metric;
   for a first user of the first plurality of users that is not included in the second plurality of users, determining that the causal connection between the first metric and the second metric is valid for the first user; and
   providing a causal insight to the first user indicating the causal connection between the first metric and the second metric.

2. The computer-implemented method of claim 1, further comprising:
   determining a cluster that includes the first plurality of users, wherein the cluster is determined based at least in part on similarity scores between the initial causal graph of each of the first plurality of users.

3. The computer-implemented method of claim 2, further comprising:
   subsequent to the experiments, re-clustering the first plurality of users into a first cluster and a second cluster, wherein the first cluster and the second cluster are determined based at least in part on similarity scores between at least one of the initial causal graph or the updated causal graph of each of the first plurality of users.

4. The computer-implemented method of claim 1, wherein determining that the causal connection between the first metric and the second metric is valid for the first user includes performing a non-parametric causality test with respect to causal connections indicated in the updated causal graphs of at least a portion of the second plurality of users and a first initial causal graph of the first user to determine that the first metric and the second metric are valid for the first user.

5. The computer-implemented method of claim 1, further comprising:
   determining a candidate causal connection between the first metric and the second metric based at least in part on:
      a first plurality of independence tests between a first metric data corresponding to the first metric and each of a plurality of other metric data of the plurality observed metric data; or
      a second plurality of independence tests between a second metric data corresponding to the second metric and each of a plurality of other metric data of the plurality observed metric data.

6. The computer-implemented method of claim 1, wherein determining that the change in the first metric caused the effect on the second metric, further includes:
   determining, based at least in part on a statistical independence test between the first metric data and the second metric data, that the causal connection between the first metric and the second metric is valid.

7. The computer-implemented method of claim 1, further comprising:
   in response to determining that the change to the first metric caused the effect on the second metric, determining a first causal strength score indicating a strength of a causal connection between the first metric and the second metric.

8. The computer-implemented method of claim 7, further comprising:
   determining the first causal strength score based at least in part on a first amount of change in the first experiment metric data and a second amount of change in the second experiment metric data.

9. The computer-implemented method of claim 7, further comprising:
   determining, from a plurality of causal connections indicated in the updated causal graph for the user, each causal connection including a corresponding causal strength score, that the first causal strength score is a highest causal strength score; and
   in response to determining that the first causal strength score is the highest causal strength score, including the causal connection between the first metric and the second metric in the causal insight.

10. A computing system, comprising:
   one or more processors; and
   a memory storing program instructions that, when executed by the one or more processors, cause the one or more processors to at least:
      receive, from each of a plurality of user devices, observational metric data generated by the respective user device, wherein the observational metric data includes a plurality of metrics measured by the user device and corresponding to a user associated with the user device;
      determine, for each of the plurality of users and based at least in part on the observational metric data, an initial causal graph indicating candidate causal connections between metrics included in the observational metric data received from the user device, wherein each of the candidate causal connections indicate a potential cause-effect relationship between a pair of metrics of the plurality of metrics;
      receive, from a first user device of the plurality of users devices, that is associated with a first user, a selection of an experiment to be performed by the first user during a period of time;
      receive, from the first user device, experiment data generated by the first user device during the experiment performed by the first user, wherein:
         the experiment includes at least:
            changing a first metric for a defined period of time; and
            measuring an effect on a second metric during the defined period of time; and
         the experiment data includes at least:
            first metric data corresponding to the first metric generated by the first user device during the defined period of time; and
            second metric data corresponding to the second metric generated by the first user device during the defined period of time;
      determine, based at least in part on the first metric data and the second metric data, that the change to the first metric caused the effect on the second metric;
      determine, for a second user that is different than the first user that a causal connection between the first metric and the second metric is valid for the second user; and
      provide, as an insight to the second user, a causal insight corresponding to the causal connection between the first metric and the second metric.

11. The computing system of claim 10, wherein the program instructions, when executed by the one or more processors, further cause the one or more processors to at least:
   define, based at least in part on the initial causal graph of each of the plurality users, a cluster that includes at least a portion of the plurality of users.

12. The computing system of claim 11, wherein the program instructions, when executed by the one or more processors to define a cluster, further include instructions that, when executed by the one or more processors, further cause the one or more processors to at least:
   generate, for each initial causal graph of each of the plurality of users, an embedding vector representative of the initial causal graph; and
   define the cluster based at least in part on distances between each embedding vector in an embedding space.

13. The computing system of claim 10, wherein the program instructions, when executed by the one or more processors, further cause the one or more processors to at least:
   determine that the change in the first metric caused the effect on the second metric; and
   in response to a determination that the change to the first metric caused the effect on the second metric, update an initial causal graph of the first user to form an updated causal graph for the first user that includes a second causal connection between the first metric and the second metric.

14. The computing system of claim 13, wherein the program instructions, when executed by the one or more processors, further cause the one or more processors to at least:
determine a causal strength score indicating a causal strength between the first metric and the second metric for the first user.

15. The computing system of claim 13, wherein the program instructions, when executed by the one or more processors to determine the causal connection, further include instructions that, when executed by the one or more processors further cause the one or more processors to at least:
perform a non-parametric causality test with respect to causal connections in the updated causal graph and a second initial causal graph of the second user to determine that the first metric and the second metric are valid for the second user.

16. The computing system of claim 10, wherein the program instructions, when executed by the one or more processors further cause the one or more processors to at least:
determine an amount of the defined period of time for which the first metric was satisfied.

17. The computing system of claim 10, wherein the program instructions, when executed by the one or more processors further cause the one or more processors to at least:
receive, from a third party, observational metric data corresponding to the first user; and
determine an initial causal graph for the first user based at least in part on metrics included in observational metric data generated by a first device associated with the first user and metrics included in observational metric data received from the third party.

18. The computing system of claim 10, wherein the first metric is changed based on a change in a behavior of the first user.

19. The computing system of claim 10, wherein the insight includes a recommendation that the second user change a behavior corresponding to the first metric to cause a change in the second metric.

20. A method, comprising:
receiving, from a first user, a selection of an experiment to be performed by the first user during a period of time, wherein the experiment includes changing a first metric of a pair of metrics for the period of time;
collecting, over the period of time as the experiment is performed by the first user and using one or more sensors of a device of the first user, an experiment metric data about the first user for a plurality of metrics, wherein:
the experiment metric data includes a first experiment metric data for the first metric and a second experiment metric data for a second metric of the pair of metrics; and
the first metric and the second metric are included in the plurality of metrics;
determining, for the first user and based at least in part on the experiment metric data, a causal connection between the first metric and the second metric;
receiving observational metric data corresponding to a second user for the plurality of metrics, wherein the second user is different than the first user;
determining, for the second user and based at least in part on the experiment metric data and the observational metric data, that the causal connection between the first metric and the second metric is valid for the second user; and
providing a causal insight to the second user indicating the causal connection between the first metric and the second metric.

21. The method of claim 20, further comprising:
generating, for each of a first plurality of users, including the first user and the second user, an initial causal graph indicating one or more candidate causal connections between two or more metrics of the plurality of metrics; and
defining at least one cluster that includes a second plurality of users that is included in but less than the first plurality of users based at least in part on the initial causal graphs created for each of the first plurality of users, wherein the second plurality of users includes at least the first user and the second user.

22. The method of claim 21, further comprising:
updating a first initial causal graph corresponding to the first user to form an updated causal graph that includes the causal connection.

23. The method of claim 21, wherein:
a causal graph exists that corresponds to each of the second plurality of users; and
a strength score for each causal connection of the causal graph may be different for different users of the second plurality of users.

24. The method of claim 20, further comprising:
determining, for the first user, a strength score representative of a strength of the causal connection between the first metric and the second metric.

25. The method of claim 20, wherein the causal insight indicates to the second user that a change in behavior corresponding to the first metric will cause a change in the second metric.

* * * * *